United States Patent [19]

Dileone

[11] Patent Number: 4,755,623
[45] Date of Patent: Jul. 5, 1988

[54] POLYFUNCTIONAL AMINE CROSSLINKER, PROCESS FOR MAKING SAME, AND COMPOSITIONS CONTAINING SAME

[75] Inventor: Roland Dileone, Rowayton, Conn.

[73] Assignee: American Cyanamid Company, Stamford, Conn.

[21] Appl. No.: 529,234

[22] Filed: Sep. 6, 1983

[51] Int. Cl.⁴ .................. C07C 103/141; C08F 10/00; C08C 19/22

[52] U.S. Cl. .................................. 564/160; 525/186; 525/328.2; 525/328.4; 525/381; 528/123

[58] Field of Search ............. 564/160; 525/186, 328.2, 525/328.4, 381; 528/123

[56] References Cited

U.S. PATENT DOCUMENTS

| | | | |
|---|---|---|---|
| 3,048,620 | 8/1962 | Spivack | 564/160 X |
| 3,159,538 | 12/1964 | Nordmann | 564/160 X |
| 3,933,663 | 1/1976 | Thompson et al. | 564/160 X |
| 4,278,814 | 7/1981 | Sachdev | 564/160 |
| 4,490,501 | 12/1984 | Vasta | 525/381 |
| 4,506,054 | 3/1985 | Vasta | 525/326.3 |
| 4,517,378 | 5/1985 | Vasta | 525/381 |

Primary Examiner—Herbert J. Lilling
Attorney, Agent, or Firm—Roger S. Benjamin

[57] ABSTRACT

A sterically unhindered, trifunctional primary amine is provided. This compound is useful as a crosslinking agent for a composition containing an amine-reactive polymer. Also provided is a low temperature cure composition containing the amine-reactive polymer and the trifunctional primary amine, and a crosslinked coating obtained by curing such a composition. Additionally, there is provided a process of synthesizing the novel trifunctional primary amine.

8 Claims, No Drawings

POLYFUNCTIONAL AMINE CROSSLINKER, PROCESS FOR MAKING SAME, AND COMPOSITIONS CONTAINING SAME

TECHNICAL FIELD

This invention relates to low temperature curing thermoset resins. More particularly, this invention relates to a novel crosslinking agent for an amine-reactive polymer, to a process for synthesizing the crosslinking agent, to a composition containing the crosslinking agent, and to a crosslinked coating formed from the composition.

BACKGROUND ART

The reaction of maleic diesters with certain diamines is known, as illustrated by the work of Yu. T. Tanckuk and I. A. Ral'chuk, *J. Organic Chem.* U.S.S.R., Vol. 14, pp. 2083-2088 (1978). In this work, the reported reaction products are a polyamide that retains the maleic acid double bond, an addition product in which each amine group of the diamine has added by Michael reaction to the double bond of a maleic diester, and a maleic diester derivative in which one of the ester groups has been replaced by an amide group (an amic ester).

Low temperature cure coating compositions based on amine-reactive polymers, as illustrated by U.S. patent application Ser. No. 346,329, filed Feb. 5, 1982, and now abandoned, and U.S. patent application Ser. No. 377,504, filed May 12, 1982, now U.S. Pat. No. 4,446,280, are known to me. These coating compositions are based upon solvent borne, solution polymers containing activated ester groups. In Ser. No. 377,504, the polymer thereof is crosslinked by the use of an amine-terminated triazine resin, to give a film with good resistance properties. However, the coatings are often rather brittle. In Ser. No. 346,329, the crosslinking agent may be a long chain diamine such as 4,7-dioxo-1,10-decanediamine (DODA) or a shorter aliphatic diamine such as 1,6-hexanediamine. Flexibility can be obtained by using a long chain diamine such as DODA, but at the expense of hardness. In fact, it is difficult to prepare films with a Knoop hardness over 3 when using DODA. Moreover, when a shorter aliphatic diamine is used, it is difficult to obtain an acceptable crosslink density. The six carbon chain of 1,6-hexanediamine is too short to provide efficient utilization of the activated ester groups. Therefore, there has existed an urgent need for a crosslinking agent that makes possible low temperature cure, that yields a hard yet flexible film having good resistance properties, and that provides efficient utilization of the amine-reactive groups of the crosslinkable polymer. Hence, the provision of such a crosslinking agent and of compositions based thereon useful, for example, for coatings and adhesive applications, would constitute a significant advance in the art.

SUMMARY OF THE INVENTION

It is accordingly one object of the present invention to provide a crosslinking agent that makes possible low temperature cure, that yields a hard yet flexible film having good resistance properties, and that provides efficient utilization of the amine-reactive groups of a crosslinkable polymer.

A further object is to provide a composition based on such a crosslinking agent.

A still further object is to provide a crosslinked coating obtained by curing this composition.

An even further object is to provide a process for synthesizing the crosslinking agent.

Additional objects, advantages and novel features of the invention will be set forth in the description which follows, and in part will become apparent to those skilled in the art upon examination of the following or may be learned by practice of the invention.

To achieve the foregoing objects and in accordance with the purpose of the present invention, as embodied and broadly described herein, there is provided a novel crosslinking agent. This crosslinking agent is a sterically unhindered, trifunctional primary amine of the formula

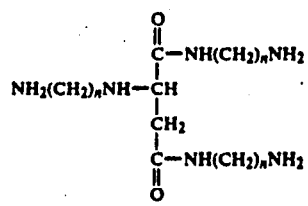

in which n=4-8. Also provided is a process for making the crosslinking agent that includes the steps of (a) reacting an unsaturated diester of the formula

in which R is an alkyl of 1-4 carbon atoms, with a diamine of the formula

in which n=4-8, and (b) recovering the trifunctional amine. The reaction is carried out at a temperature sufficient to remove ROH byproduct by distillation, and the diamine/diester molar ratio is at least about 3:1.

Also provided is a low temperature cure composition containing an amine-reactive polymer, and the crosslinking agent described above. The crosslinking agent is present in an amount sufficient to form a crosslinked polymer. The presence of the crosslinking agent in the composition makes possible low temperature cure, results in a hard yet flexible film having good resistance properties, and provides efficient utilization of the amine-reactive groups of the crosslinkable polymer. Also provided by the present invention is a crosslinked coating obtained by curing this composition.

DETAILED DESCRIPTION

In the present invention, crosslinking utilizes the reaction between a polymer bearing amine-reactive groups and a crosslinking agent containing primary amine groups. This reaction takes place under low temperature conditions. I have unexpectedly found that the inclusion of an amide functionality in the middle of a long chain polyamine provides harder films while retaining flexibility. More complete conversion of the amine-reactive groups is made possible by the presence of at least 12, preferably at least 16, carbon and/or nitrogen atoms in the linking chains between primary amine groups.

The novel crosslinking agent of this invention is a sterically unhindered, trifunctional primary amine of the formula

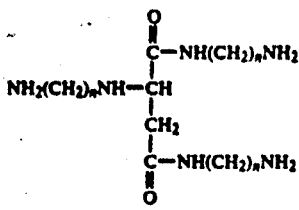

in which n=4–8. The preferred trifunctional primary amine is N,N'-bis(6-aminohexyl)-2-[(6-aminohexyl)amino]butanediamide, in which n in the above formula is 6.

The trifunctional amine can be used as a crosslinking agent for an amine-reactive polymer such as in epoxy systems. The polymer is curable by reaction with a crosslinking agent having a plurality of primary amine groups. Applications of the resulting composition include coatings and adhesives. Conveniently, the amine-reactive polymer contains repeating units derived from an activated ester-containing vinyl monomer of the formula

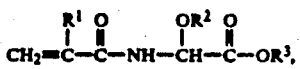

in which the $R^1$ group is selected from H and Me, the $R^2$ group is selected from alkyls of 1–6 carbon atoms, cycloalkyls of 5–6 carbon atoms, and 2-hydroxyalkyls of 2–6 carbon atoms, and the $R^3$ group is selected from alkyls of 1–6 carbon atoms, cycloalkyls of 5–6 carbon atoms, and 2-hydroxyalkyls of 2–6 carbon atoms. Suitable vinyl monomers include methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred.

These vinyl monomers are suitably formed by the procedures set forth in U.S. patent application Ser. No. 346,325, which is discussed earlier, the relevant portions of the disclosure of which are hereby incorporated by reference into this description. Additionally, attention is invited to two illustrative procedures set forth later in this description of the present invention.

The activated ester group-containing polymer may contain repeating units derived from one or more copolymerizable ethylenically unsaturated monomers. Useful comonomers include, but are not limited to, $C_1$–$C_{18}$, preferably $C_1$–$C_8$, alkyl esters of acrylic acid, $C_1$–$C_{18}$, preferably $C_1$–$C_8$, alkyl esters of methacrylic acid, hydroxy-containing monomers such as hydroxyethyl acrylate, hydroxypropyl acrylate, hydroxyethyl methacrylate and hydroxypropyl methacrylate, styrene, alpha-methyl styrene, acrylonitrile, acrylamide, acrylic acid, methacrylic acid and vinyl acetate.

The polymer containing activated ester groups may be polymerized, or more preferably copolymerized with these other monomers, according to conventional polymerization techniques. No special precautions are required. However, for viscosity control in solution polymers, a hydrogen bonding solvent should be included in the polymerization solvent mixture. Procedures for forming solvent borne, solution polymers are set forth in U.S. patent application Ser. No. 377,504, now U.S. Pat. No. 4,446,280, which is discussed earlier, and the relevant portions of the description of this patent application are hereby incorporated by reference into this description. Attention is also invited to the illustrative polymerization procedures set forth below in the description of the present invention.

The amount of the trifunctional amine used in a composition containing a primary amine-reactive polymer, may vary widely and is generally determined by a number of factors such as the extent of crosslinking desired and the particular reactants employed. In any event, the crosslinker is used in a sufficient amount to form a crosslinked polymer. Generally, the functional groups of the amine crosslinker in the composition will range from about 0.5 to 10 equivalents based on the primary amine-reactive functionality of the polymer employed. Preferably, about 0.8 to 1.2 equivalents of the primary amine groups are used.

When the composition is based upon an activated ester group-containing polymer, the polymer should contain from about 2–35 weight percent of repeating units derived from the activated ester-containing vinyl monomer. In the case of a solvent borne, solution polymer, optimum properties are obtained when about 20–35 weight percent of the repeating units are derived from this monomer.

A later invention of which I am aware is disclosed and claimed in copending application U.S. Ser. No. 529,237 filed Sept. 6, 1983, in the names of D. A. Ley and H. Burkhard, now U.S. Pat. No. 4,522,973, relates to a low temperature crosslinkable emulsion containing an emulsified polymer bearing activated ester groups. In the activated ester-containing vinyl monomer thereof, $R^1$ is H or methyl, and the $R^2$ and $R^3$ groups are independently selected from alkyls of 1–4 carbon atoms. For these emulsions, it is preferred that the polymer contain about 2–10 weight percent of repeating units derived from the activated ester-containing vinyl monomer thereof. Except for these distinctions, the disclosure set forth above pertains to this type of low temperature crosslinkable composition.

The crosslinkable, amine-reactive polymer used in the present invention, is cured by reaction with the trifunctional primary amine, at low temperature. By "low temperature" is meant from about ambient temperature up to and including about 50° C., and, in certain instances, up to and including about 100° C. When MAGME is used as the activated ester-containing vinyl monomer, crosslinking can occur at room temperature. When higher alkyl esters are used, such as the butyl ester, heating is required to obtain the crosslinked film.

The composition of the present invention is readily cured by exposure to an appropriate low temperature for an adequate period of time. The speed of curing depends upon factors including the particular temperature at which curing is carried out, the components forming the composition, and the presence or absence of an accelerator.

The composition may contain such other ingredients as are customarily employed in coating compositions. Such ingredients include pigments, and flow additives and modifiers. Compositions of the present invention based upon solvent borne, solution polymers bearing activated ester groups, are useful as general purpose coatings, as well as coatings in automotive, wood, decorative, textile and paper applications.

The novel crosslinking agent of the present invention is synthesized by heating an unsaturated diester of the formula

in which R is an alkyl of 1-4 carbon atoms, with a diamine of the formula

in which n=4-8, and collecting an alcohol such as methanol in the case where R is methyl, as the byproduct. The diester is an ester of either maleic or fumaric acid, with a convenient diester being dimethyl maleate. The preferred diamine is 1,6-hexanediamine.

The amount of heat applied to the reaction vessel is selected to give a pot temperature at which distillation of the alcohol byproduct occurs. The reactants are combined in a molar ratio of at least about 3:1 (diamine:-diester). A molar ratio of about 3:1 is convenient. If a molar ratio of more than about 3:1 is used, typically the molar ratio will be only slightly more than 3:1, with about 5:1 being a practical upper limit because of difficulty in removing the unreacted excess of diamine. Conveniently, the reaction is a solventless reaction, i.e., no solvent is added to the reactants, the reactants are mixed with stirring during the course of the reaction, and the reaction is carried out under ambient atmosphere. The reaction is continued until no more alcohol byproduct is evolved. The desired product is recovered, for example, by pouring the reaction mixture into a large excess of toluene, and separating as the product, the material that is insoluble in toluene and more dense than toluene.

A later invention of which I am aware, which is disclosed and claimed in copending application U.S. Ser. No. 529,233, filed Sept. 6, 1983, now U.S. Pat. No. 4,495,366, in the names of D. A. Ley and H. Burkhard, relates to an improved process for forming the trifunctional amine. This process is illustrated as follows:

Dimethyl maleate (72 g, 0.5 moles) is added over a 2-3 hour period to a solution of 1,6-hexanediamine (174 g, 1.5 moles) in toluene (360 g) at 75°-80° C. The reaction temperature rises from 80° to 110° C. under reflux conditions. After the addition is completed, methanol is distilled at a reaction temperature of 120°-125° C. Additional toluene (320 g) is added to maintain reaction volume. The reaction may be followed by amine titration or by disappearance of the methyl ester in the $^1$H NMR spectrum. After the reaction is complete, toluene is removed under vacuum (50°-70° C., 15-20 mm Hg) to give N,N'-bis(6-aminohexyl)-2-[(6-aminohexyl)amino]butanediamide as a viscous liquid which solidifies on standing.

In the illustrative procedures which follow, all parts and percentages are by weight unless otherwise specified.

EXAMPLE 1

A reaction vessel containing dimethyl maleate (43.2 g, 0.3 moles) and hexamethylenediamine (175 g, 1.5 moles) is heated under ambient atmosphere with stirring, so as to remove by distillation, methanol as the byproduct. After 90 minutes, the pot temperature increases to 170° C., and the reaction is terminated since no more methanol byproduct is being evolved. The reaction mixture is poured into a large excess of toluene, and a product is separated that is insoluble in toluene and more dense than toluene. IR and NMR spectra are consistent with the desired N,N'-bis(6-aminohexyl)-2-[(6-aminohexyl)amino]butanediamide structure. The product yield is 50.0 g. The product is insoluble is toluene, chlorobenzene and carbon tetrachloride, and soluble in methylene dichloride, cellosolve, methanol, chloroform and water.

EXAMPLE 2

A reaction vessel containing dimethyl maleate (72 g, 0.5 moles) and hexamethylenediamine (197 g, 1.7 moles) is heated under ambient atmosphere, and methanol is collected as the byproduct of the reaction. The reaction is continued for 3 hours 35 minutes by which time the pot temperature has increased to 170° C. The reaction mixture is extracted with approximately 1000 ml toluene using approximately 200 ml portions. The toluene is separated, and the remaining product is dissolved in methylene dichloride and filtered through a medium glass filter. The yield is 76%.

Preparation of Methyl Acrylamidoglycolate Methyl Ether (MAGME)

To a three-necked flask equipped with a stirrer and an extractor filled with a molecular sieve drying agent is added 300 parts acrylamidoglycolic acid, 3000 parts parts methanol, 0.05 parts phenothiazine, 4.5 parts 98% sulfuric acid and 200 parts chloroform. The mixture is heated to reflux and the distillate is allowed to pass through the extractor for 6¼ hours. The mixture is cooled and allowed to stand for 16 hours at which point the mixture is warmed to about 40° C., 19 g of sodium carbonate is added, and the solution is stirred for 2¼ hours. The mixture is filtered and vacuum stripped of solvent. The solid residue is extracted with chloroform. Diethyl ether is added to the extract and a polymeric mass precipitates which is discarded. The remaining extract is stripped of solvent to yield 264.2 parts of crude MAGME.

Preparation of Butyl Acrylamidoglycolate Butyl Ether

One hundred parts of acrylamidoglycolic acid, 517 parts butanol, 1 part conc. sulfuric acid and 0.1 part monomethyl ether of hydroquinone are mixed in a flask equipped with a Dean Stark water trap and a stirrer. The mixture is heated until homogeneous. After 5-10 minutes, 100 ml of toluene is added and the mixture is brought to reflux and held 5 hours until the theoretical amount of water is collected by azeotrope. The toluene and excess butanol are removed under vacuum to yield 173 parts of the crude product.

Preparation of Polymer A

Methyl acrylamidoglycolate methyl ether (33.2 parts) is dissolved in 59.8 parts absolute ethanol and 89.6 parts toluene. To this are added 66.4 parts butyl acrylate, 42.6 parts methyl methacrylate, 16.6 parts styrene, 4.2 parts acrylic acid, 1.7 parts n-dodecyl mercaptan, and 3.3 parts t-butylperoxyisobutyrate. Toluene (10 parts) and 6.6 parts ethanol are placed in a flask and heated to 82° C. under a N$_2$ purge. The monomer mixture is slowly added over a 6.5 hour period. The reaction mixture is held at 82° C. for an additional 12 hours.

The polymer has the following characteristics: clear yellow color, dish solids (2 hrs. at 105° C.) 52.9%, non-volatiles, theoretical Tg of polymer, 16° C.

Preparation of Polymer B

The procedure used for Polymer A is again followed except that the reactants are as follows:

| | |
|---|---|
| methyl acrylamidoglycolate methyl ether | 34.0 parts |
| butyl acrylate | 53.1 parts |
| methyl methacrylate | 49.7 parts |
| styrene | 28.9 parts |
| acrylic acid | 4.3 parts |
| n-dodecyl mercaptan | 1.7 parts |
| t-butylperoxyisobutyrate | 3.4 parts |
| abs. ethanol | 68.0 parts |
| toluene | 102.0 parts |

The resulting polymer is a clear yellow liquid, dish solids of 52.5%, and a theoretical Tg of 30° C.

Preparation of Polymer C

Polymer C is prepared by in situ formation of high and low Tg polymer fractions.

| | Parts by Weight | |
|---|---|---|
| Component | Charge 1 | Charge 2 |
| abs. ethanol | 20.4 | 47.6 |
| toluene | 30.6 | 71.4 |
| methyl acrylamidoglycolate methyl ether | 12.8 | 29.8 |
| butyl acrylate | 27.8 | 24.4 |
| methyl methacrylate | 4.6 | 21.4 |
| styrene | 4.6 | 40.5 |
| acrylic acid | 1.3 | 3.0 |
| n-dodecyl mercaptan | 0.1 | 1.2 |
| t-butyl peroctoate | 0.2 | 2.4 |

Charge 1 is placed in a flask and heated to 82° C. under a $N_2$ purge. A slight exotherm is noticed. The solution is held at 82° C. for 4 hrs. Charge 2 is slowly added over a 3 hr. period. The reaction mixture is held an additional 12 hrs. at 82° C. The polymer has the following characteristics: clear yellow solution, dish solids 52.0%, Brookfield viscosity, 1700 centipoises.

EXAMPLE 3

1.6 Parts of N,N'-bis(6-aminohexyl)-2-[(6-aminohexyl)amino]butanediamide in 1.2 parts of toluene is blended with 20 parts of Polymer A, and 0.2 parts 2-hydroxypyridine in 1.0 part ethanol is added as catalyst. The mixture is cast into films on pretreated aluminum panels and cured at the temperatures shown in the Table. A 20 minute cure time is used for 100° C., and a 14 day cure time is used at room temperature. Properties are given in the Table.

EXAMPLE 4

The procedure of Example 3 is followed except that Polymer B is used. Properties are set forth in the Table.

EXAMPLE 5

The procedure of Example 3 is followed except that 3.4 parts of the amine crosslinker is added to 20 parts of Polymer C. Properties are given in the Table.

COMPARATIVE EXAMPLES 1-3

The procedures of Examples 3-5 are followed except that an amine terminated triazine resin (equivalent weight=262) in methyl cellosolve® (50% solids) is used as a crosslinker. This resin is obtained according to the procedures set forth in U.S. patent application Ser. No. 377,504, filed May 12, 1982, the relevant portions of which are hereby incorporated by reference into this description. In this regard, the resin is obtained by either melt condensation of the aminotriazine compound with the amine in the presence of an acid catalyst at temperatures of 120° to 250° C. or by reaction of the chloride (such as cyanuric chloride) with the amine in the presence of an acid scavenger. Examples are given in U.S. Pat. No. 2,393,755 and in E. M. Smolin and L. Rapport, "s-Triazine and Derivatives" in "The Chemistry of Heterocyclic compounds, a series of Monographs", A. Weissberger, Editor, Interscience Publishers, Inc., New York, 1959. Properties of the three films obtained are given in the Table.

TABLE

Film Properties Using N,N'-bis(6-aminohexyl)-2-[(6-aminohexyl)amino]butanediamide or an Amine-Terminated Triazine Resin as the Crosslinking Agent

| | Polymer | Cure Temp. | Solvent Resistance[1] | Hardness[2] | Humidity Resistance[3] | Water Resistance[4] | Impact Resistance[5] | | Flexibility[6] |
|---|---|---|---|---|---|---|---|---|---|
| | | | | | | | Front | Reverse | |
| Example 3 | A | RT | 200+ | 1.5 | >240 | >340 | 25 | 25 | Pass |
| | | 100 | 200+ | 4.3 | >240 | >340 | 25 | 25 | Pass |
| Example 4 | B | RT | 200+ | 3.4 | >240 | >340 | 25 | 15 | Pass |
| | | 100 | 200+ | 8.8 | >240 | >340 | <20 | 5 | Pass |
| Example 5 | C | RT | 200+ | 2.7 | >240 | >340 | 25 | 10 | Pass |
| | | 100 | 200+ | 9.0 | >240 | >340 | 20 | <10 | Pass |
| Comparative Example 1 | A | RT | 200+ | 1.8 | 24 | 5 | <5 | <3 | Pass |
| | | 100 | 200+ | 5.3 | >240 | >340 | <5 | <3 | Pass |
| Comparative Example 2 | B | RT | 200+ | 9.2 | >240 | 5 | <5 | <3 | Fail |
| | | 100 | 200+ | 11.8 | >240 | >340 | <10 | <3 | Fail |
| Comparative Example 3 | C | RT | 200+ | 11.5 | 1 | 24 | <5 | <3 | Fail |
| | | 100 | 200+ | 14.4 | >240 | 24 | <10 | <3 | Fail |

[1] Methyl ethyl ketone double rubs required to remove 50% of film
[2] Knoop Hardness
[3] 38° C. Cleveland ® Humidity Resistance, hours to show an effect on the film
[4] 40° C. Water Immersion, hours to show an effect on the film
[5] Inch-Pounds Required to cause failure
[6] Conical Mandril The above examples are illustrative of my invention. It is to be understood that these examples are not in any way to be interpreted as limiting the scope of the invention. Rather, it is intended that the scope of the invention be defined by the claims set forth below.

When the low temperature cure composition of the present invention is based upon an activated ester group-containing polymer, the speed of cure provided by my novel trifunctional amine will in certain cases be substantially faster than the speed of cure of a diamine such as 1,6-hexanediamine. Furthermore, in this embodiment of my low temperature cure composition, the solution polymer contains from about 1 to 100 wt. % of the repeating units derived from the activated ester group-containing vinyl monomer.

What is claimed is:

1. A trifunctional primary amine of the formula

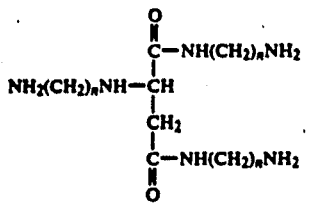

wherein $n = 4-8$.

2. The trifunctional primary amine of claim 1, wherein $n = 6$.

3. A process for making a trifunctional primary amine of the formula

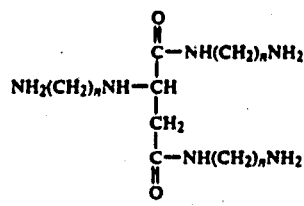

wherein $n = 4-8$; said process comprising (a) reacting an unsaturated diester of the formula

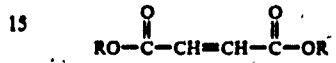

wherein R is an alkyl of 1-4 carbon atoms, with a diamine of the formula $$NH_2(CH_2)_nNH_2$$

wherein n is the same as above, at a temperature sufficient to remove ROH byproduct by distillation, the diamine/diester molar ratio being at least about 3:1; and (b) recovering the trifunctional primary amine.

4. The process of claim 3, wherein the diester is dimethyl maleate.

5. The process of claim 3, wherein the diester is diethyl maleate.

6. The process of claim 3, wherein the diamine is 1,6-hexanediamine.

7. The process of claim 3, wherein $n = 6$ in the trifunctional primary amine product.

8. The process of claim 3, wherein the diamine/diester molar ratio is about 3:1.